(12) United States Patent
Zumsteg (10) Patent No.: US 7,583,654 B2
(45) Date of Patent: Sep. 1, 2009

(54) SUB-FRAME SYNCHRONIZED MULTIPLEXING

(75) Inventor: Philip J. Zumsteg, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 639 days.

(21) Appl. No.: 11/320,089

(22) Filed: Dec. 28, 2005

(65) Prior Publication Data

US 2007/0147436 A1    Jun. 28, 2007

(51) Int. Cl.
*H04J 3/06* (2006.01)
(52) U.S. Cl. ........................................ 370/350
(58) Field of Classification Search ................. 370/350
See application file for complete search history.

(56) References Cited

U.S. PATENT DOCUMENTS

| | | | |
|---|---|---|---|
| 3,813,496 A | 5/1974 | Maillet | |
| 4,021,780 A | 5/1977 | Narey et al. | |
| 5,485,163 A | 1/1996 | Singer et al. | |
| 5,508,708 A | 4/1996 | Ghosh et al. | |
| 5,512,908 A | 4/1996 | Herrick | |
| 5,926,765 A | 7/1999 | Sasaki | |
| 5,952,969 A | 9/1999 | Hagerman et al. | |
| 5,973,643 A | 10/1999 | Hawkes et al. | |
| 6,006,097 A | 12/1999 | Hornfeldt et al. | |
| 6,011,974 A | 1/2000 | Cedervall et al. | |
| 6,031,490 A | 2/2000 | Forssen et al. | |
| 6,034,635 A | 3/2000 | Gilhousen | |
| 6,052,597 A | 4/2000 | Ekstrom | |
| 6,061,021 A | 5/2000 | Zibell | |
| 6,084,547 A | 7/2000 | Sanderford et al. | |
| 6,108,553 A | 8/2000 | Silventoinen et al. | |
| 6,121,928 A | 9/2000 | Sheynblat et al. | |
| 6,127,945 A | 10/2000 | Mura-Smith | |
| 6,167,276 A | 12/2000 | Pite | |
| 6,169,497 B1 | 1/2001 | Robert | |
| 6,172,644 B1 | 1/2001 | Stilp | |
| 6,188,354 B1 | 2/2001 | Soliman et al. | |
| 6,195,046 B1 | 2/2001 | Gilhousen | |
| 6,243,587 B1 | 6/2001 | Dent et al. | |
| 6,243,588 B1 | 6/2001 | Koorapaty et al. | |
| 6,249,253 B1 | 6/2001 | Nielsen et al. | |
| 6,256,505 B1 | 7/2001 | Kingdon et al. | |

(Continued)

FOREIGN PATENT DOCUMENTS

JP        4023644        1/1992

OTHER PUBLICATIONS

Barrett, Terence, "History of Wideband (UWB) Radar & Communications: Pioneers and Innovators".

(Continued)

*Primary Examiner*—Melvin Marcelo
(74) *Attorney, Agent, or Firm*—Fogg & Powers LLC (57) ABSTRACT

A method of communication that includes transmitting a communication signal having a synchronization preamble from a first node. Setting a local clock of at least one second node pursuant to the synchronization preamble to synchronize communications between the first and at least one second node. Exchanging subsequent data communications between the first and at least one second node without additional preambles until a special switch point occurs and after the special switch point occurs, transmitting information that utilizes the period of reduced time-synchronization accuracy following data communication.

26 Claims, 8 Drawing Sheets

U.S. PATENT DOCUMENTS

| | | |
|---|---|---|
| 6,275,471 B1 | 8/2001 | Bushmitch et al. |
| 6,275,705 B1 | 8/2001 | Drane et al. |
| 6,282,427 B1 | 8/2001 | Larsson et al. |
| 6,285,321 B1 | 9/2001 | Stilp et al. |
| 6,292,516 B1 | 9/2001 | Petsko et al. |
| 6,321,091 B1 | 11/2001 | Holland |
| 6,330,452 B1 | 12/2001 | Fattouche et al. |
| 6,331,825 B1 | 12/2001 | Ladner et al. |
| 6,342,854 B1 | 1/2002 | Duffett-Smith et al. |
| 6,347,228 B1 | 2/2002 | Ludden et al. |
| 6,381,464 B1 | 4/2002 | Vannucci |
| 6,404,388 B1 | 6/2002 | Sollenberger et al. |
| 6,421,009 B2 | 7/2002 | Suprunov |
| 6,593,883 B2 | 7/2003 | Johnson et al. |
| 6,611,233 B2 | 8/2003 | Kimura |
| 6,822,951 B1 | 11/2004 | Patton |
| 7,376,045 B2 | 5/2008 | Falkenberg et al. |
| 2001/0040702 A1 | 11/2001 | Leung |
| 2002/0027896 A1 | 3/2002 | Hughes et al. |
| 2003/0198212 A1 | 10/2003 | Hoctor et al. |
| 2005/0024038 A1 | 2/2005 | Santhoff et al. |
| 2005/0026563 A1 | 2/2005 | Leeper et al. |
| 2005/0063328 A1 | 3/2005 | Dunagan et al. |
| 2005/0135284 A1 | 6/2005 | Nanda et al. |
| 2005/0271150 A1 | 12/2005 | Moore et al. |
| 2005/0276319 A1 | 12/2005 | Akiyama et al. |
| 2006/0187909 A1 | 8/2006 | Sho et al. |
| 2006/0291537 A1 | 12/2006 | Fullerton et al. |
| 2007/0253400 A1 | 11/2007 | Zumsteg |
| 2008/0056308 A1* | 3/2008 | Zumsteg ............... 370/503 |
| 2008/0170559 A1* | 7/2008 | Zumsteg ............... 370/350 |

OTHER PUBLICATIONS

Fontana, Robert J., "A Brief History of UWB Communications", , Publisher: Multispectral Solutions, Inc.

Girod, Lewis, "Localization", , Publisher: Distributed Embedded Systems, 2003.

"802.15.3 MAC layer Overview and Proposed Enhancements to Support UWB PHY", , Publisher: Mobile and Portable Radio Research Group, Virgina Tech.

Lee, K.K., "UWB Overview", , p. 80.

Pomalaza-Raez, Carlos et al., "A Unified Approach to Dynamic TDMA Slot Assignment and to Distributed Routing for Multi-Hop Packet Radio Networks".

Somayazulu, V. Srinivasa et al., "Design Challenges for Very High Data Rate UWB Systems", , Publisher: Intel Labs, Published in: Hillsboro, OR.

Webb, Warren, "Ultrawideband: an Electronic Free Lunch?", Dec. 21, 2000, pp. 85-92, Publisher: EDN, Published in: US.

Young, C. David, "USAP Multiple: Dynamic Resource Allocation for Mobile Multihop Multichannel Wireless Networking", , pp. 1-5, Publisher: IEEE, 1999.

* cited by examiner

SUB-FRAME SYNCHRONIZED MULTIPLEXING

BACKGROUND

A typical wireless communication system is composed of two or more transmitter/receiver nodes adapted to communicate with each other. To accomplish a message exchange or data communications, between nodes, each node is adapted to selectively switch between transmit and receive modes by local node control. Communication systems use time, frequency and code division multiplexing to ensure only a single transmitter is active at any given instant in time, for a given set of times, frequencies and codes, within the geographical region defined by the wireless signal propagation characteristics of the communicating nodes Two or more communicating nodes within a geographical region comprise a wireless communications network. All nodes in the network are adapted to synchronize in time, frequency and code, in a manner that enables successful communication. The precision, or resolution, of the synchronization determines, in part, the overall communications network performance and efficiency. In particular, the need for time synchronization among nodes is typically required to provide a means for determining when each node should transmit or receive. Each node typically includes a local clock, which is synchronized with the local clocks in other nodes according to a scheme employed by the particular wireless network. The synchronization process typically includes exchanging a sequence of information known to all nodes, called a preamble, which is transmitted by one node and received by one or more other nodes. Each receiving node adjusts the local clock to match the transmitted preamble sequence, and achieve time synchronization.

As a function of the resolution available to synchronize the clocks, some ambiguity may exist between two or more clocks, potentially leading to the case where two or more nodes are transmitting simultaneously, an undesirable situation in most wireless networks. A means of avoiding this situation is to provide a "guard band" time after each node completes a transmission, prior to a different node starting to transmit. The duration of the guard band time is sufficiently long to ensure any clock ambiguity is resolved, thereby avoiding the situation with multiple simultaneously transmitting nodes.

The clock in each node operates with a specified stability, independently from the clocks in all other nodes, and as a result may drift out of synchronization with the clocks in one or more other nodes. The required accuracy, or tolerance, of time synchronization among the node clocks is determined by the type of communication signals exchanged between nodes. It is therefore necessary to periodically perform a clock synchronization activity involving all communicating nodes. The time interval between such synchronization activities is referred to as a communications frame.

The nodes in many wireless communications networks are powered by energy sources exceeding the requirements of the node. The duration of the communications frame is typically limited only by the clock drift in the node, and may include generous guard band periods for ensuring only a single node is transmitting at a time. Nodes in other wireless communications networks may be powered by limited capacity energy sources, such as batteries. In wireless networks with such energy-constrained nodes, the communications frame must be carefully designed to be energy-efficient, with minimal duration guard bands, so the node's maximum operational time from the energy source can be obtained.

During the communications frame time period, the nodes in the wireless communications network exchange information, with one node transmitting at a time, and one or more other nodes receiving the information. The information is typically encoded in a time-varying signal created by the transmitting node, and decoding process relies on the transmitting and receiving nodes to be time-synchronized, thus all information exchange occurs during the communications frame, following the preamble, and any applicable guard band periods.

Wireless communications networks may perform sensing and control applications by including in each node one or more sensors or actuators. When dispersed throughout a region, multiple nodes in such a network may function in a collaborative manner to provide a sensing or actuating mechanism with a scope greater than possible with a single node. For example, a passive sensing application may include multiple nodes, each creating a time-stamp of when a particular acoustic signal was detected. Based on the different times-of-arrival (ToA) of the acoustic signal at each node, it is possible to determine the position of the sound source relative to the receiving nodes. Since it is possible the ToA period at one or more nodes may exceed the communications frame duration, it would be necessary to perform the clock synchronization activity during the ToA measurement period of the sensed acoustic signal, in order to ensure the nodes remain in time-synchronization for the purpose of creating a time-stamp when the acoustic signal is sensed.

For energy-constrained wireless sensor nodes, the need to maintain clock synchronization suitable for information exchange during a sensing or actuation activity is sub-optimal for collaborating nodes, since new information to exchange is available only after the collaboration has completed. However, such collaboration may require the collaborating nodes to maintain time-synchronization, though with a coarser resolution than for information exchange.

For the reasons stated above, and for other reasons stated below which will become apparent to those skilled in the art upon reading and understanding the present specification, there is a need in the communication industries for a method to provide collaboration among two or more transmitter/receiver nodes that reduces multiple re-synchronization preambles and minimizes energy consumption at each node and utilizes the residual clock synchronization period remaining after data communication is completed in the current communications frame.

SUMMARY

The above-mentioned problems of current wireless communication systems are addressed by embodiments of the present invention and will be understood by reading and studying the following summary and specification.

In one embodiment a method of communication is provided. The method includes transmitting a communication signal having a synchronization preamble from a first node. Setting a local clock of at least one second node pursuant to the synchronization preamble to synchronize communications between the first and at least one second node. Exchanging subsequent data communications between the first and at least one second node without additional preambles until a special switch point occurs and after the special switch point occurs, transmitting information that utilizes the period of reduced time-synchronization accuracy following data communication.

In another embodiment, a method of communication between nodes during a residual time synchronization period is provided. The method includes issuing a residual switch point to initiate information exchange between nodes that can occur during the residual time synchronization period. The method also includes starting a schedule timer in each node in response to the residual switch point and performing activities at each node based on selected schedule entries in a received schedule and a schedule timer in each node.

In still another embodiment, a communication node is provided. The communication node includes a local clock, a transmitter/receiver circuit, a synchronization circuit and a control circuit. The local clock is adapted to clock operations of the communication node. The transmitter/receiver circuit is adapted to selectively transmit and receive communication signals. The synchronization circuit is adapted to synchronize the local clock with a received communication signal from another communication node to establish communications between the communication nodes. The control circuit is adapted to control the transmitter/receiver circuit and the synchronization circuit, the control circuit being adapted to process communication signals. The control circuit is further adapted to direct communications between the communication nodes without re-synchronizing the local clock for a period of time. Moreover, the control circuit is further adapted to exchange information in response to a special switch point.

In another embodiment, a communication system is provided. The communication system includes at least two communicating nodes. Each node is adapted to synchronize a local clock to establish communications based on a synchronizing preamble received in an initial communication frame. Each node is further adapted to send and receive other information in sub-frames based on a residual switch point.

In finally another embodiment, another communication system is provided. The communication system includes a means for providing ultra wide band data communication for a period of time between two or more nodes with only sub-frame signals after an initial signal with a preamble establishes synchronization between the nodes and a means for exchanging other information that requires less precision of time synchronization than required for data communication based on a special switch point.

DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide methods and systems for efficiently using the residual clock synchronization period remaining after data communication is completed in the current communications frame. The present invention is related to the Sub-frame Synchronized Signaling application filed on Jul. 14, 2005, having application Ser. No. 11/181,281 (the '281 application) which is herein incorporated by reference. The Sub-frame Synchronized Signaling application provided methods and apparatus for sub-frame synchronized signaling that avoids many of the resynchronization periods caused by preambles at the start of each transmission frame, and selection, or multiplexing, of which node is to transmit at a particular point during a communication frame.

In one embodiment of the present invention, once the desired message exchange has occurred between nodes for data communications the residual time synchronization between the nodes may be used for a period of time for application(s) other than data communications, providing a multiplexing of functions during the residual period of time synchronization between two or more nodes. The residual time synchronization period is indicated by a switch point according to the '281 application, and includes both a time period during which the time synchronization between nodes may still be adequate for data communications, as well as some period of time after the time synchronization between nodes has drifted far enough apart that data communications is no longer reliable. The duration of the residual time synchronization period is determined by the time synchronization requirements of the application using the residual time synchronization period.

Figure 1A:
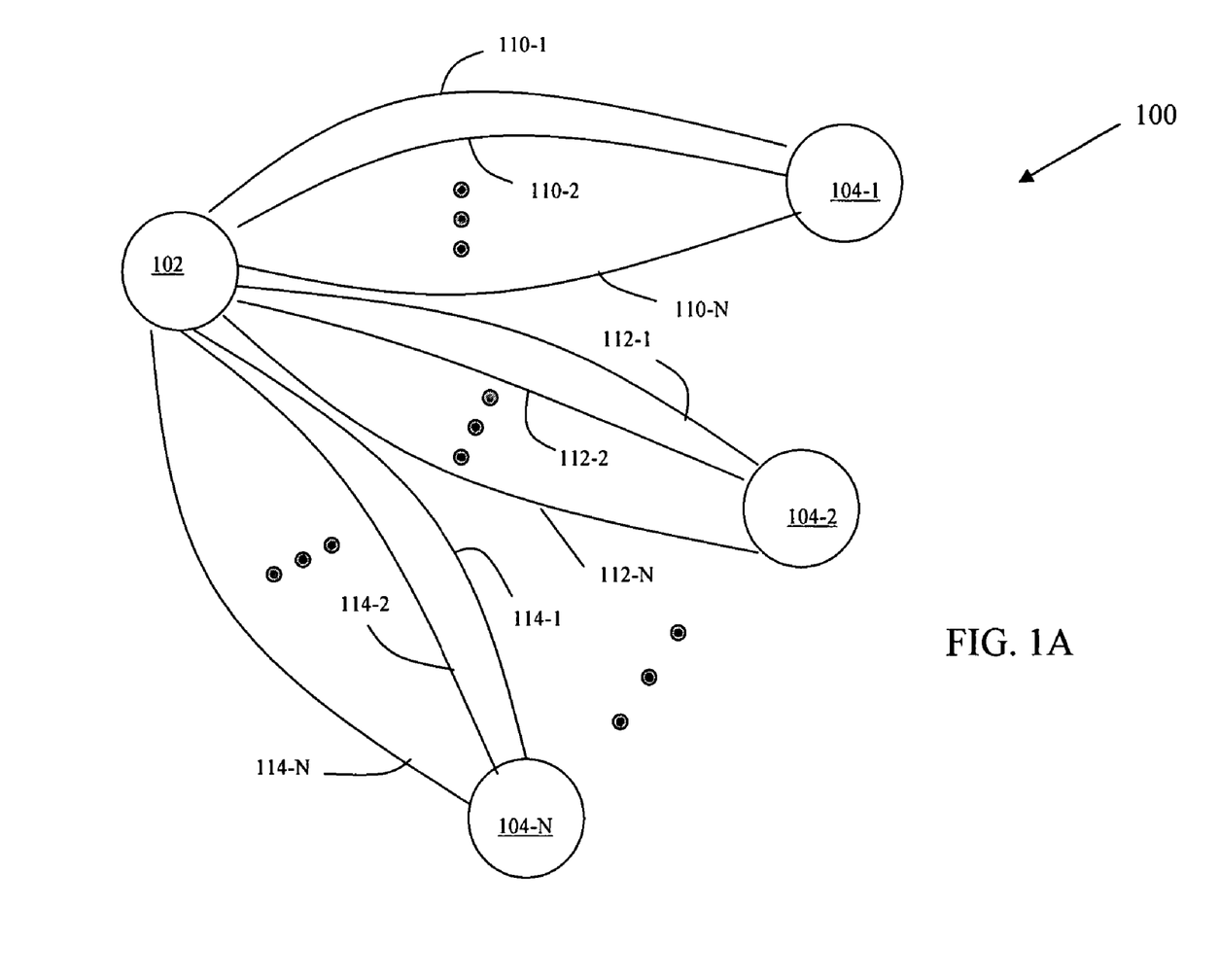
FIG. 1A is a diagram of one embodiment of a communications system of the present invention.

In FIG. 1A, one embodiment of a data communications system 100 of the present invention is illustrated. In this embodiment, the data communication system 100 includes communication node 102 and communication nodes 104-1 through 104-N. The communication nodes 102 and 104-1 though 104-N are adapted to communicate with each other. In particular, in the embodiment illustrated in FIG. 1A, communication node 102 is in communication with communication nodes 104-1 through 104-N. In embodiments of the present invention, a first communication node initiates a message exchange. However, it will be understood that the present invention can generally apply to two or more communication nodes, any of which may be the initial transmitting node. In the embodiment of FIG. 1A, this is communication node 102. A message exchange is started when communication node 102 transmits an initial communication signal that contains a preamble. Each receiving node uses the known sequence of information in the preamble to synchronize its local clock so communication between the transmitting node and the receiving nodes can occur. In embodiments of the present invention, communications between nodes is maintained without sending an additional preamble until the communication frame is complete. The communication frame may include multiplexing from data communications exchange between nodes to application-specific communications during a residual time synchronization period.

Referring back to FIG. 1A, the first communication signals 110-1, 112-1 and 114-1 containing the preambles and other data to be exchanged are signals may be referred to as synchronization communication signals or initial signals. Node 102 is the transmitting node when transmitting signals 110-1, 112-1 and 114-1 and nodes 104-1 through 104-N are the receiving nodes when receiving the respective first communication signals 110-1, 112-1 and 114-1. At the end of each communication signal is an indication that the signal is complete. In one embodiment, this is referred to a switch point as shown in the '281 application. The switch point indicates to the receiving node that it can now become a transmitting node to transmit a communication signal in response to a received signal. As will be understood by those skilled in the art, the switch point may be a transmitted signal from node 102 to nodes 104-1 through 104-N, or a point in time according to a schedule exchanged between node 102 and nodes 104-1 through 104-N. An example of these are signals 110-2, 112-2 and 114-2 transmitted from the respective nodes 104-1, 104-2 and 104-N back to node 102 one after another in a pre-arranged sequence. The exchange of data communications signals between the nodes continues like this until, as discussed above, a switch point occurs. In one embodiment the switch point is a special switch point or a residual switch point that indicates the start of an exchange of information that can occur during the residual time synchronization period. The last communication signal between nodes 102 and 104-1 through 104-N is illustrated as signals 110-N, 112-N and 114-N in FIG. 1A.

Figure 1B:
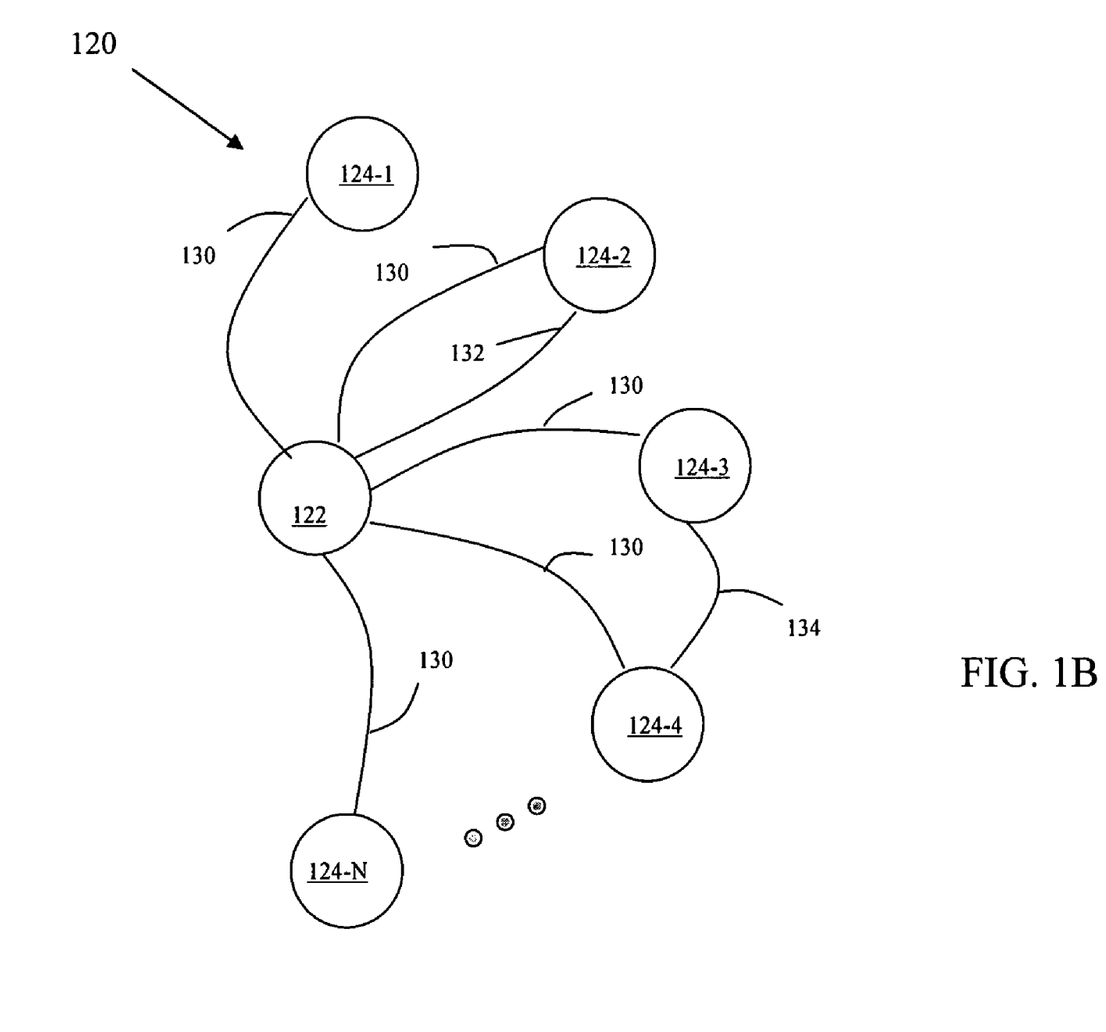
FIG. 1B is a diagram of another embodiment of a communication system of the present invention.

In one embodiment, the data communication system 100 is a point to point communication system where only two nodes are participating at a time. An example of this system in reference to the communication system 100 of FIG. 1A is when node 102 sends a first signal 110-1 to node 104-1 and then a second signal 112-1 at a later time to node 104-2. In another embodiment of the present invention, the data communication system 120 is arranged in a broadcast network where a transmitted signal is received by multiple nodes simultaneously. An example of this is illustrated in FIG. 1B. In this embodiment, only a single preamble is required since only one initial transmission signal is sent to the multiple receiving nodes. Referring to FIG. 1B, an initial signal 130 including the single preamble is broadcast from node 122 to nodes 124-1 through 124-N simultaneously. In this embodiment, a switch point is used to indicate the next transmit node. For example, in the communication system 120 of FIG. 1B, the next node to transmit, as directed by the switch point, is node 124-2. As illustrated signal 132 is transmitted from node 124-2 to node 122. Further in this example, node 124-3 is then directed to transmit signal 134 to node 124-4.

Figure 1C:
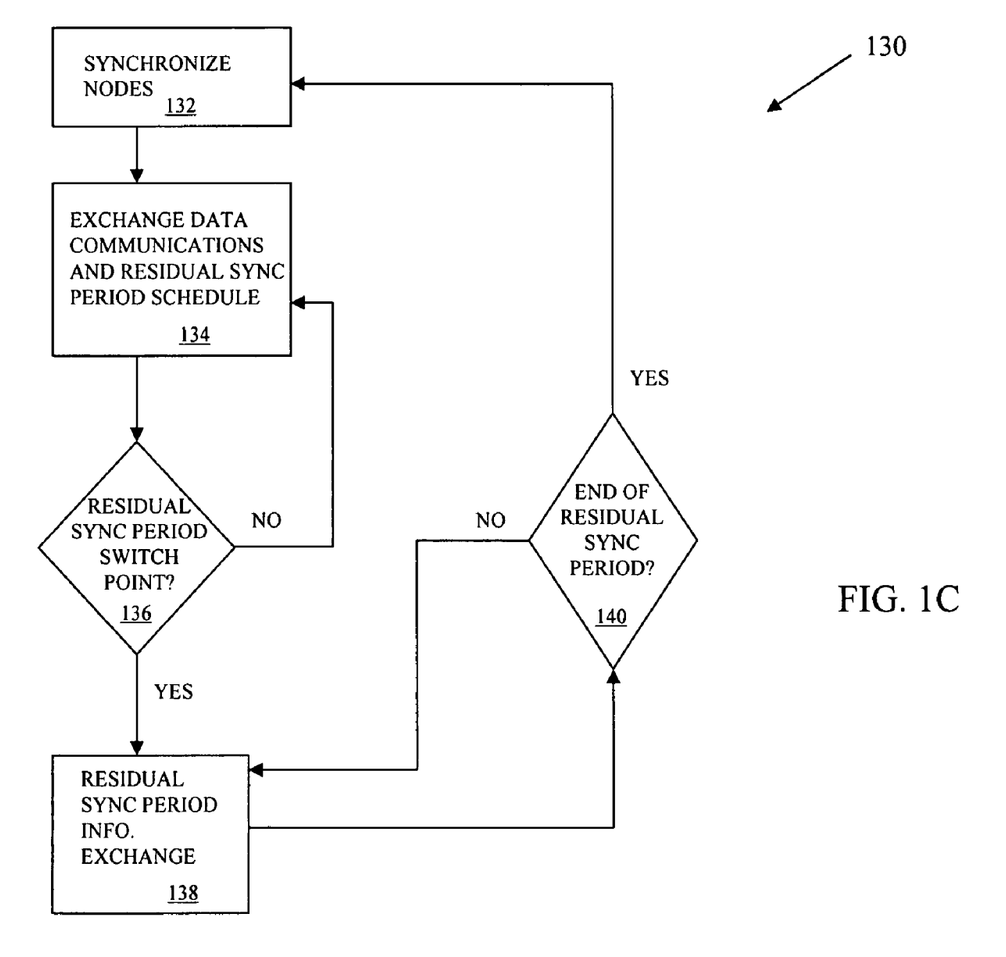
FIG. 1C is a flow diagram of communication between nodes in a communication system of one embodiment of the present invention.

As stated above, after the special switch point occurs, the nodes will remain time-synchronized for an additional period of time which can be used for other purposes. This period of time is referred to as the residual time synchronization period or period of reduced time-synchronization. Embodiments of the present invention use this residual time-synchronization between the nodes for purposes other than data communication. The flow diagram 130 of FIG. 1C illustrates the use of the residual time synchronization in one embodiment of the present invention. As illustrated, the process starts by synchronizing the nodes in communication (132). Once they are synchronized (132), data communication, possibly including a schedule for the residual time-synchronization period, is exchanged between the nodes (134). After each exchange (134), it is determined if the switch point for the residual synchronization period has been reached (136). If the switch point for the residual synchronization period has not been reached (136), data exchange continues (134).

After the switch point for the residual synchronization period has been reached (136), other information between nodes is exchanged (138). This other type of information requires less precision of time synchronization than required for data communications. After each exchange of other information (138) between nodes, it is determined if the end of the residual synchronization period has been reached (140). If the end of the residual synchronization period has not been reached (140), the exchange of other information continues between nodes (138). If the end of the residual synchronization period has been reached (140), the nodes must be re-synchronized (132).

An example of the other information is ranging pulses. These ranging pulses are embedded in the message exchange during the residual synchronization period, when the time synchronization accuracy required for data communications has been exceeded. The time synchronization accuracy during the residual period is suitable for other, non-data communication applications, such as ranging pulses. These ranging pulses may be used to determine distances and locations during the residual synchronization period. The time synchronization precision during the residual synchronization period is suitable for other, non-data communications applications such as RF frequency propagation measurements. These measurements can also be conducted during the residual synchronization period. In an embodiment that measures RF frequency propagation, a transmitting node transmits a series of pulses during the residual synchronization period. The receiving nodes measure the signal levels also during the residual synchronization period. The information obtained from this embodiment is useful in wireless networks and is used to build routing tables. In yet another example, signals during the residual time synchronization period contain application level synchronization information such as information to control how a network behaves. Application level synchronization information can be used for such things as to cause a sensor to take a measurement, process information obtained from the measurement and return data regarding the processed information in the next time-synchronized data communication period. Other types of communication can be utilized during the residual synchronization period and the present invention is not limited to those listed above.

Figure 2:
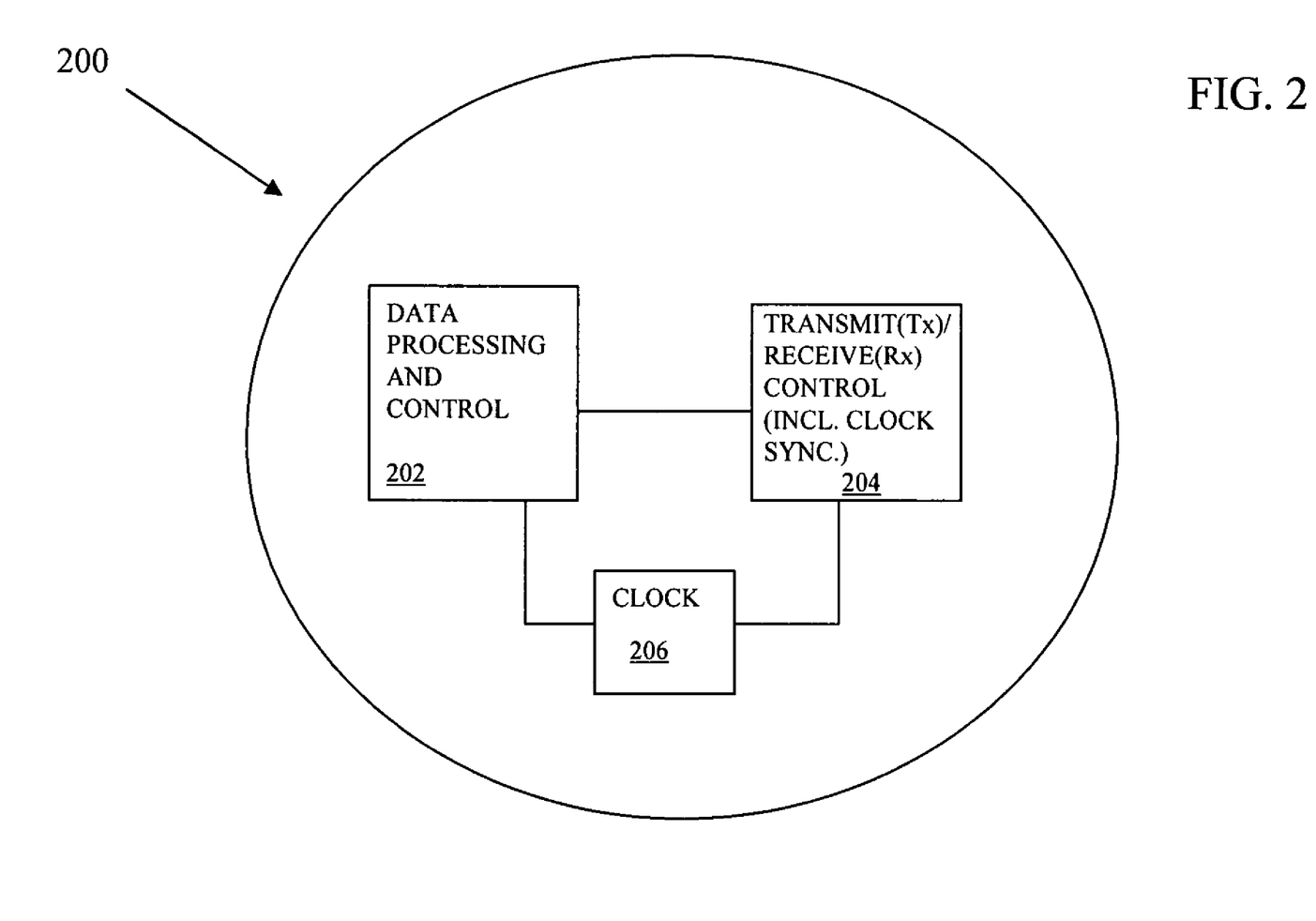
FIG. 2 is communication node of one embodiment of the present invention.

FIG. 2, illustrates one embodiment of a node 200 of the present invention. Node 200 includes a data processing and control circuit 202, a transmit (Tx)/receive (Rx) circuit 204 and a local clock 206. The Tx/Rx circuit 204 includes a local clock synchronization circuit, which processes the received preamble from a transmitting node for the purpose of synchronizing the local clock 206. As illustrated the clock 206 is used by both the control circuit 202 and the Tx/Rx circuit 204. The Tx/Rx circuit uses the clock, for among other things, to determine time intervals between data. The control circuit 202 uses the clock among other things, to determine when to send and pass received data, and time-related scheduling of the node during the residual synchronization period.

Figure 3:
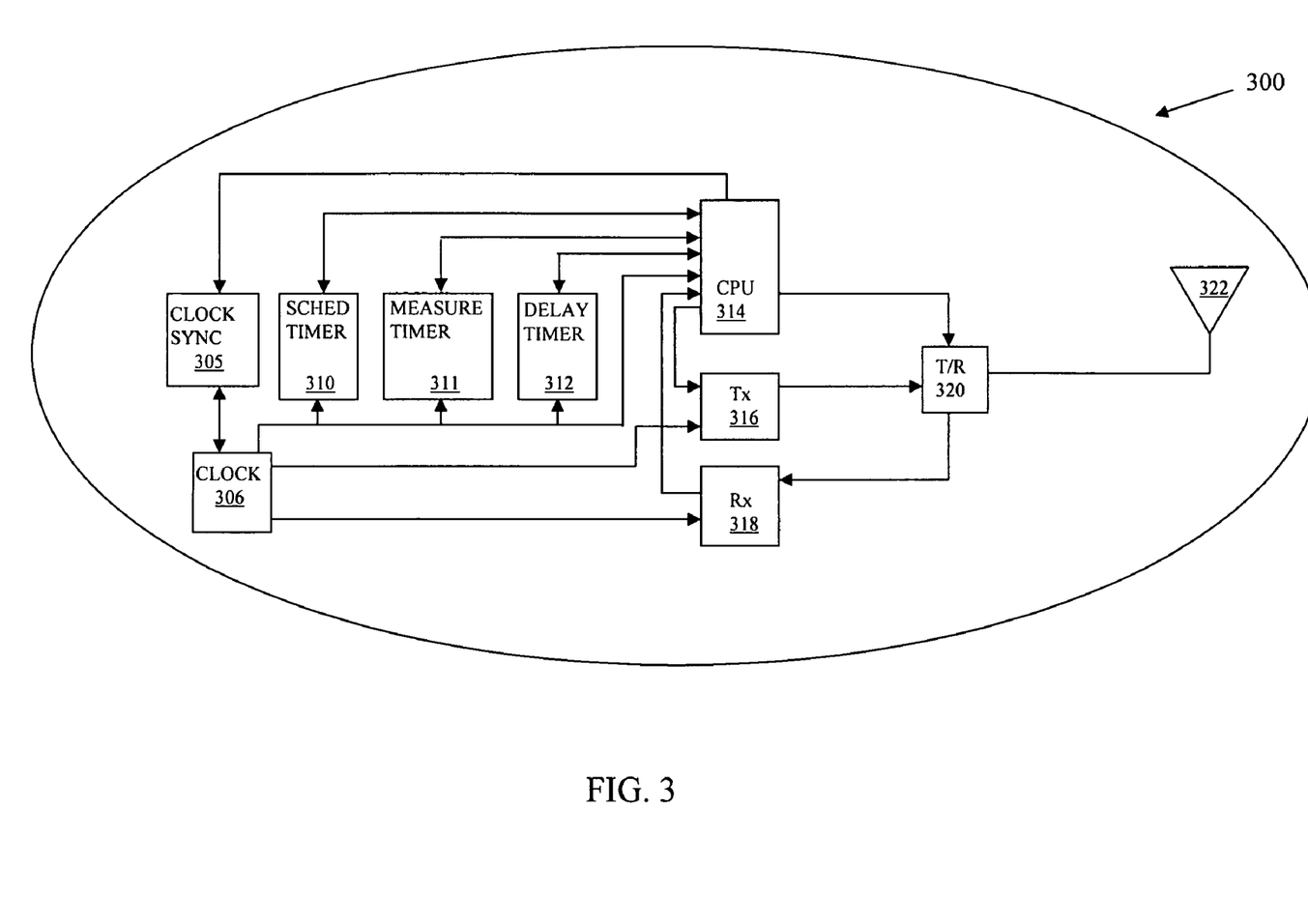
FIG. 3 is a communication node of another embodiment of the present invention.

An example of a more detailed node 300 of one embodiment of the present invention is illustrated in FIG. 3. Node 300 includes an antenna 322, a transmit (T)/receive(R) switch 320, a CPU 314, a Tx 316, a Rx 318, a clock synchronization circuit 305, a local clock 306, and local timers for scheduling 310, measurement 311 and delay 312. The CPU 314 controls the T/R switch 320 and timers 310, 311 and 312, and responds to indications from the clock 306 and timers 310, 311 and 312. When node 300 is transmitting the T/R switch 320 is placed in a transmitting position, and when node 300 is receiving the T/R switch is placed in a receiving position.

The clock synchronization circuit 305 is used to adjust and monitor the local clock 306. In particular, when an initial transmission with a preamble is received through the receiver 318, the synchronization circuit 305 is used to synchronize clock 306 with the clock of the node which sent the initial transmission. After the clocks are synchronized, the clock synchronization circuit 310 monitors the drift of the clock. In one embodiment, clock drift is monitored by measuring the error rate resulting from using the local clock to detect the time-synchronous signaling from the transmitter. As the clock drifts (away from the Tx clock) the error rate increases. In one embodiment, the error rate is measured by detecting when a cyclic redundancy code (CRC) scheme, forward error correction method, or other error detection and correction scheme fails to successfully correct data errors.

As illustrated in FIG. 3, the clock 306 is further in communication with the transmitter 316 to clock the transmission of data in a transmission signal and with the receiver 318 to clock the receiving of data in a received signal. The CPU is in communication with the transmitter 320 to process data to be transmitted. The CPU 314 is also in communication with the receiver 318 to process data in a received signal. The embodiment of FIG. 3 also includes timers 310,311 and 312. The CPU 314 is also in communication with timers 310, 311 and 312. The schedule timer 310 is used for among other things, to monitor the schedule of both the data communications and residual synchronization periods. The measure timer 311 is used for among other things, to measure the elapsed time from a particular time in the schedule until an event is detected, such as receiving a ranging pulse. The delay timer 312 is used for among other things to create a time delay from a particular time in the schedule until the node should transmit a signal.

Figure 4:
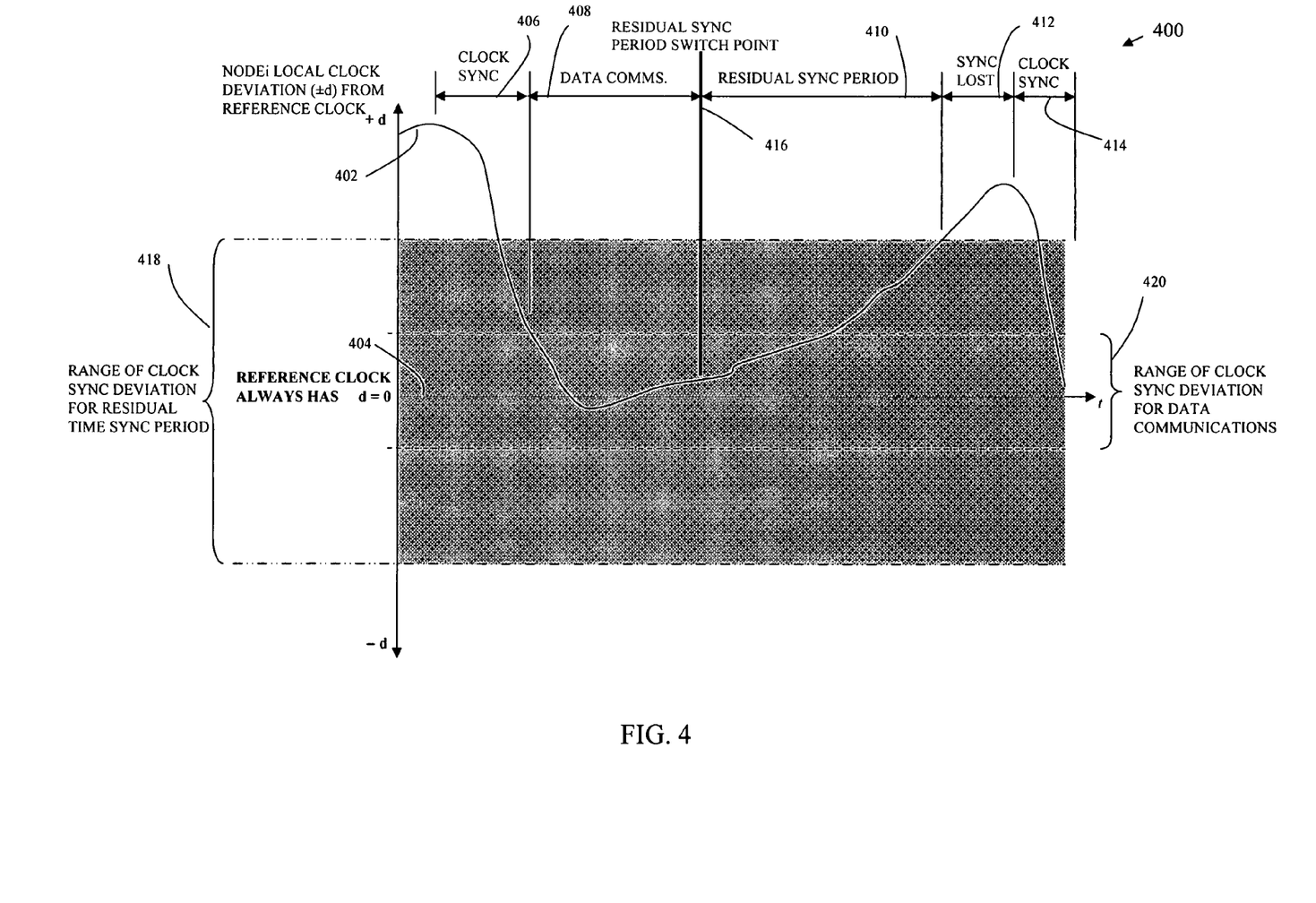
FIG. 4 is an illustration of a representation of the various time synchronization periods of one embodiment of the present invention.

FIG. 4 depicts the time-varying behavior of the local clock in a node (400). In particular, FIG. 4 illustrates the effect on the local clock (402) of the time-synchronization process while receiving a clock synchronization preamble (406), and the drift of the local clock relative to the reference node (404) transmitting the time-synchronization preamble. In the embodiment illustrated in FIG. 4, a single node is participating in the clock synchronization activity with the reference node. Using a single node is by way of example and not by limitation and the present invention is not limited to a single node. As those skilled in the art will understand, the time-varying clock deviation (402) will vary from the local clock in one node, to local clocks in other nodes, and may exhibit both positive and negative clock deviations at various points in time. In one embodiment of the present invention, during the clock synchronization period (406), the local clock in a node is time-synchronized with the reference clock (404) in the node providing the preamble, causing the local clock (402) to minimize the deviation from the reference clock (404).

In one embodiment of the present invention, the local clock in a node will remain within the tolerance required for data communications (420) for a period of time (408), and data message exchange is accomplished between and among two or more nodes during the data communications synchronization period (408). In one embodiment of the present invention, the message exchange includes the distribution of a schedule to all participating nodes describing the activities of each node during the residual synchronization period (410). The schedule for each node may be entered into the node by means other than during the data communications period (408). Moreover, the manner of entering the schedule into a node is made by example and not by way of limitation. The data communications continues until a switch point (416) according to application '281 occurs to indicate the beginning of the residual synchronization period (410).

During the residual synchronization period (410) each node processes a schedule describing activities for the node during the residual synchronization period (410). When the residual synchronization period ends, the deviation between the local clock in the node and the reference clock exceeds the required tolerances for both data communications (420) and the residual synchronization period (418), and useful clock synchronization is lost (412).

Following a period of lost clock synchronization (412), another clock synchronization period (414) may be initiated by a node transmitting a preamble. The duration of the lost clock synchronization period (412) may, or may not be, deterministic, and is not a limitation of the present invention. According to application '281, a new time synchronization period begins with the transmission of a preamble by a node, and the selection of the node transmitting the initial signal containing the preamble may, or may not, be the same node which previously transmitted a preamble.

Figure 5:
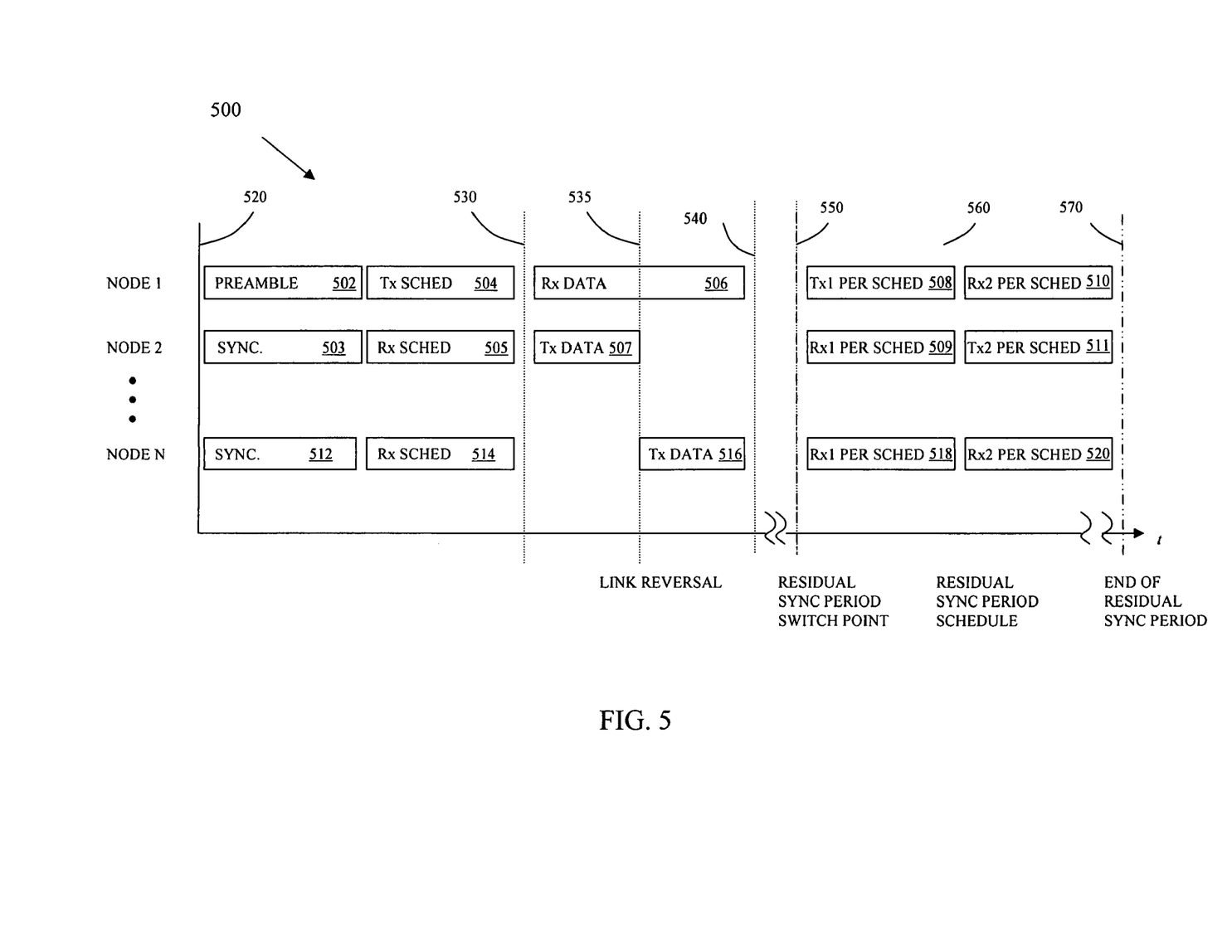
FIG. 5 is a graph illustrating communications of one embodiment of the present invention.

FIG. 5 illustrates an example of system 500 behavior of one embodiment of the present invention, consisting of Node 1, Node 2, . . . Node N during a period of time between initial time-synchronization of nodes (520), to conclusion of the residual synchronization period (570). As those skilled in the art will understand, FIG. 5 is only one of many possible behaviors of the example system 500. In FIG. 5, Node 1 is the initial transmitting node, according to application '281, and transmits a signal containing a time-synchronization preamble (502). Other nodes in the system 500 receive the signal containing the preamble and synchronize the local clock in each node (503, 512). In one embodiment of the present invention, Node 1 transmits a schedule (504) describing the activity each other Node 2 (505), . . . Node N (514) should perform during the residual synchronization period.

A switch point (530) is issued to select another node to transmit, in the example in FIG. 5, this is Node 2 (507). The example in FIG. 5 also includes a second switch point (535) selecting Node N to transmit (516). Subsequent switch points, such as (540), may also be issued, in accordance with application '281. The number of switch points, or selection of node to transmit, is not a limitation of the present invention. A special switch point or residual switch point (550) is issued to indicate the beginning of the residual synchronization period (560).

During the residual synchronization period (560) each node performs according to the residual synchronization period schedule for each node. The example behavior of system 500 in FIG. 5 illustrates Node 1 transmitting first (508) while Node 2 and Node N are receiving the signal (509, 518) from Node 1. The next node selected by the schedule to transmit is Node 2 (511), while Node 1 and Node N receive the signal (510, 520). The end of the residual synchronization period (570) is determined by the schedule. In the example, the system 500 remains inactive until a node transmits an initial message containing a preamble to start another time synchronization period. The periodicity of transmitting an initial message is not a limitation of the present invention.

One possible application of system 500 and the indicated behavior in FIG. 5 is a ranging application, enabling multiple nodes in a wireless network to determine the distance between pairs of nodes. For example, the transmitted schedule (504) indicates the sequence in which Node 1, . . . Node N are to transmit during the residual synchronization period (560). During the data communication link reversal periods following switch points (530, 535), Node 1, . . . Node N may exchange additional data with Node 1 and each other, all without limitation. Since all nodes in the example system 500 are clock-synchronized with Node 1, the Time-of-Flight (ToF) of a wireless signal propagating between a transmitting node and one or more receiving nodes may be measured at each receiving node. At the scheduled time during the residual synchronization period Node 1 transmits a ranging pulse sequence (508), and simultaneously, Node 2, . . . Node N start a measurement timer in each node. When Node 1, . . . Node N receive the ranging pulse sequence (509, 518) the measurement timer in each node is stopped. The measurement timer value is stored at each node, and associated with the transmission from Node 1. Subsequent activity during the residual synchronization period provides for additional ranging data to be collected, when Node 2 transmits a ranging pulse sequence (511) which is received and processed by Node 1 and Node N (510, 520). During a subsequent data message exchange, the results of the individual node measurements may be distributed as necessary to other nodes in the wireless sensor network for the purpose of computing distances between nodes.

Figure 6:
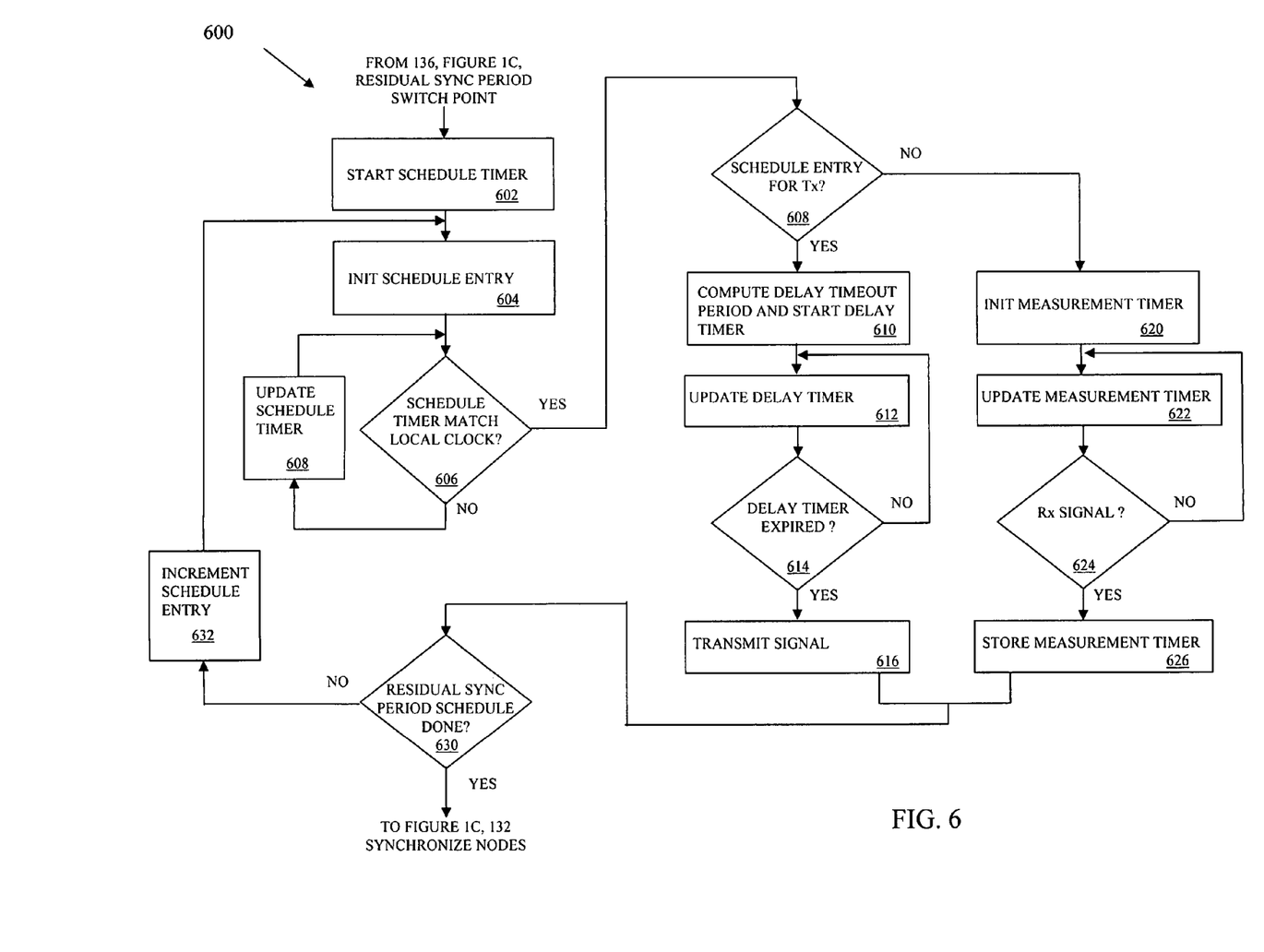
FIG. 6 is a flow diagram of utilizing the various time synchronization periods of one embodiment of the present invention.

Referring to FIG. 6, a flow diagram 600 of one embodiment is illustrated, describing the activities performed by a node during the residual synchronization period information exchange (FIG. 1C, 138). A switch point occurs (FIG. 5, 550) as described in the application '281, indicating the start of the residual synchronization period. Each receiving node responds to the switch point by starting a schedule timer (602) according to the schedule for the residual time synchronization period. Since the local clock (FIG. 3, 306) provides the timebase for the schedule timer (FIG. 3, 310), and the local clocks of all nodes are time-synchronized, it will be understood by those skilled in the art that the schedule clocks of all nodes are also time-synchronized, with the same time synchronization precision as the local clocks.

The schedule time value at which the node is to perform an activity is obtained from the currently selected schedule entry (604). This time value is then periodically compared with the local clock (606), and the schedule timer is updated (608) when the local clock does not match the schedule time value. The timebase for updating the schedule clock is the local clock. When the schedule timer matches the current local clock, the scheduled activity is selected.

Then node activity may be to transmit a signal (608) or receive a signal (620), all without limitation. When the activity is to transmit a signal, the node may determine a time delay (610), initialize and update a delay timer (612) using the local clock as a timebase, then wait (614) for the delay timer value to expire, prior to transmitting the signal (616). The duration of the delay may be greater than or equal to zero seconds, and is not a limitation of the present invention. After transmitting the signal, the node exits the process illustrated in flow diagram 600 upon completion of the residual synchronization period (630). If the residual time period is not complete, the node selects the next schedule entry (632), and performs the process in flow diagram 600 starting with initialization of the schedule entry (604).

When the node activity is to receive a signal, the node initializes the measurement timer (620) as specified by the schedule. The measurement timer is periodically updated (622), using the local clock as a timebase. When the node receives the signal indicated by the schedule, the measurement timer value is copied and stored (626). The value of the stored measurement timer may be used by an application in the node, or transmitted to another node(s) during a data message exchange period, all without limitation. After storing the measurement timer value (626), the node exits the process illustrated in flow diagram 600 upon completion of the residual synchronization period (630). If the residual time period is not complete, the node selects the next schedule entry (632), and performs the process in flow diagram 600 starting with initialization of the schedule entry (604).

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is manifestly intended that this invention be limited only be the claims and the equivalents thereof.

What is claimed is:

1. A method of communication, the method comprising:
   transmitting a communication signal having a synchronization preamble from a first node;
   setting a local clock of at least one second node pursuant to the synchronization preamble to synchronize communications between the first and at least one second node;
   exchanging subsequent data communications between the first and at least one second node without additional preambles until a special switch point occurs; and
   after the special switch point occurs, exchanging information that utilizes the period of reduced time-synchronization accuracy following data communication.

2. The method of claim 1, wherein the information is application level synchronization information.

3. The method of claim 1, wherein the information is pulses for RF propagation measurement.

4. The method of claim 1, wherein the information is ranging pulses.

5. The method of claim 1, wherein the information is pulse-position encoded data.

6. The method of claim 1, further comprising:
   distributing a schedule between the first and at least one second node describing activities of each of the first and at least one second node after the special switch point has occurred.

7. The method of claim 6, further comprising:
   starting a schedule timer in each of the first and at least one second node according to the schedule.

8. A method of communication between nodes during a residual time synchronization period, the method comprising:
   issuing a residual switch point with a node to initiate information exchange that can occur during the residual time synchronization period;
   starting a schedule timer in each node in response to the residual switch point; and
   performing activities at each node based on select schedule entries in a received schedule and the schedule timer in each node.

9. The method of claim 8, further comprising:
   distributing the schedule between the nodes in communication describing activities of each of the nodes before the residual time synchronization period.

10. The method of claim 8, further comprising:
adjusting the schedule timer in each node when a local clock to each node does not match a schedule time value.

11. The method of claim 8, further comprising:
creating a time delay before transmitting a signal by a node.

12. The method of claim 11, further comprising:
initialize and updating a delay timer using a local clock as a timebase; and
transmitting after the delay timer value has expired.

13. The method of claim 8, further comprising:
storing a measurement timer value when a node receives a signal indicated by a schedule.

14. The method of claim 13, further comprising:
using the stored measurement by an application in the node receiving the signal.

15. The method of claim 13, further comprising:
transmitting the stored measurement to another node.

16. A communication node comprising:
a local clock adapted to clock operations of the communication node;
a transmitter/receiver circuit adapted to selectively transmit and receive communication signals;
a synchronization circuit adapted to synchronize the local clock with a received communication signal from another communication node to establish communications between the communication nodes; and
a control circuit adapted to control the transmitter/receiver circuit and the synchronization circuit, the control circuit being adapted to process communication signals, the control circuit further adapted to direct communications between the communication nodes without re-synchronizing the local clock for a period of time, the control circuit further adapted to exchange information in response to a special switch point.

17. The communication node of claim 16, wherein information requires less precision of time synchronization than required for data communication and can be exchanged during a residual time synchronization period.

18. The communication node of claim 16, wherein the control circuit is further adapted to start a schedule timer based on a schedule received and perform activities based on select schedule entries in the schedule and the schedule timer in response to the special switch point.

19. A communication system comprising:
at least two communication nodes, each node being adapted to synchronize a local clock to establish communications based on a synchronizing preamble received in an initial communication frame, each node further adapted to receive and transmit communication sub-frames based on a residual switch point.

20. The communication system of claim 19, wherein the other information is at least one of ranging pulses, RF propagation measurement pulses and application level synchronization information.

21. The communication system of claim 19, wherein each node comprises:
a local clock adapted to clock operations;
a transmitter/receiver circuit adapted to selectively transmit and receive communication signals;
a synchronization circuit adapted to synchronize the local clock with a received communication signal from another communication node to establish communications between the communication nodes; and
a control circuit adapted to control the transmitter/receiver circuit and the synchronization circuit, the control circuit being adapted to process initial and sub-frame signals, the control circuit further adapted to direct communications between the communication nodes without re-synchronizing the local clock for a period of time, the control circuit further adapted to send and receive other information in sub-frames based on the residual switch point.

22. The communication system of claim 21, wherein the other information requires less precision of time synchronization than required for data communication and can be exchanged during a residual time synchronization period.

23. The communication system of claim 21, wherein the control circuit is further adapted to start a schedule timer based on a schedule received and perform activities based on select schedule entries and the schedule timer.

24. A communication system comprising:
a means for providing ultra wide band data communication for a period of time between two or more nodes with only sub-frame signals after an initial signal with a preamble establishes synchronization between the nodes; and
a means for exchanging other information that requires less precision of time synchronization than required for data communication based on a special switch point.

25. The communication system of claim 24, further comprising:
a means to provide a schedule for the exchange of other information between the two or more nodes.

26. The communication system of claim 24, further comprising:
a means to provide a schedule for the exchange of other information between the two or more nodes.

* * * * *

UNITED STATES PATENT AND TRADEMARK OFFICE
CERTIFICATE OF CORRECTION

PATENT NO. : 7,583,654 B2 Page 1 of 1
APPLICATION NO. : 11/320089
DATED : September 1, 2009
INVENTOR(S) : Philip J. Zumsteg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this

Fourteenth Day of September, 2010

David J. Kappos
*Director of the United States Patent and Trademark Office*